United States Patent [19]
Ceravolo

[11] Patent Number: 5,099,821
[45] Date of Patent: * Mar. 31, 1992

[54] MULTI-CHAMBERED BARBECUE GRILL

[76] Inventor: Frank J. Ceravolo, 2877 NE. 29th St., Fort Lauderdale, Fla. 33306

[*] Notice: The portion of the term of this patent subsequent to Jun. 12, 2007 has been disclaimed.

[21] Appl. No.: 729,643

[22] Filed: Jul. 15, 1991

Related U.S. Application Data

[63] Continuation-in-part of Ser. No. 67,698, Jun. 11, 1990.

[51] Int. Cl.$^5$ .................................................. F24B 3/00
[52] U.S. Cl. ........................ 126/25 R; 126/25 AA; 126/25 A; 126/242; 126/38; 126/26
[58] Field of Search ............ 126/25 R, 25 A, 25 AA, 126/26, 38, 151, 242

[56] References Cited

U.S. PATENT DOCUMENTS

| | | | |
|---|---|---|---|
| 3,182,585 | 5/1965 | Rensch et al. | 99/340 |
| 3,598,102 | 8/1971 | Fuss | 126/25 |
| 3,657,996 | 4/1972 | Thompson | 99/443 |
| 3,809,051 | 6/1974 | Giroux | 126/9 |
| 4,046,132 | 9/1977 | White | 126/9 |
| 4,129,111 | 12/1978 | Lehtovaara | 126/25 |
| 4,158,992 | 6/1979 | Malafouris | 99/421 |
| 4,281,633 | 8/1981 | Wackerman | 126/25 |
| 4,592,334 | 6/1986 | Logan, Jr. | 126/25 |
| 4,703,746 | 11/1987 | Hitch | 126/25 |
| 4,819,614 | 4/1989 | Hitch | 126/36 |
| 4,932,390 | 6/1990 | Ceravolo | 126/25 |

Primary Examiner—Larry Jones
Attorney, Agent, or Firm—Oltman and Flynn

[57] ABSTRACT

A multi-chambered barbecue grill having a main chamber, a cooking grill located in the main chamber, a fire source located in the main chamber below the cooking grill, an ash chamber attached to the main chamber below the fire source for catching ashes, and a reversible top chamber located above the main chamber, adapted for receiving the cooking grill in its reversed position. Various mechanisms are provided for raising and lowering the cooking grill to desired elevations above the fire source.

30 Claims, 7 Drawing Sheets

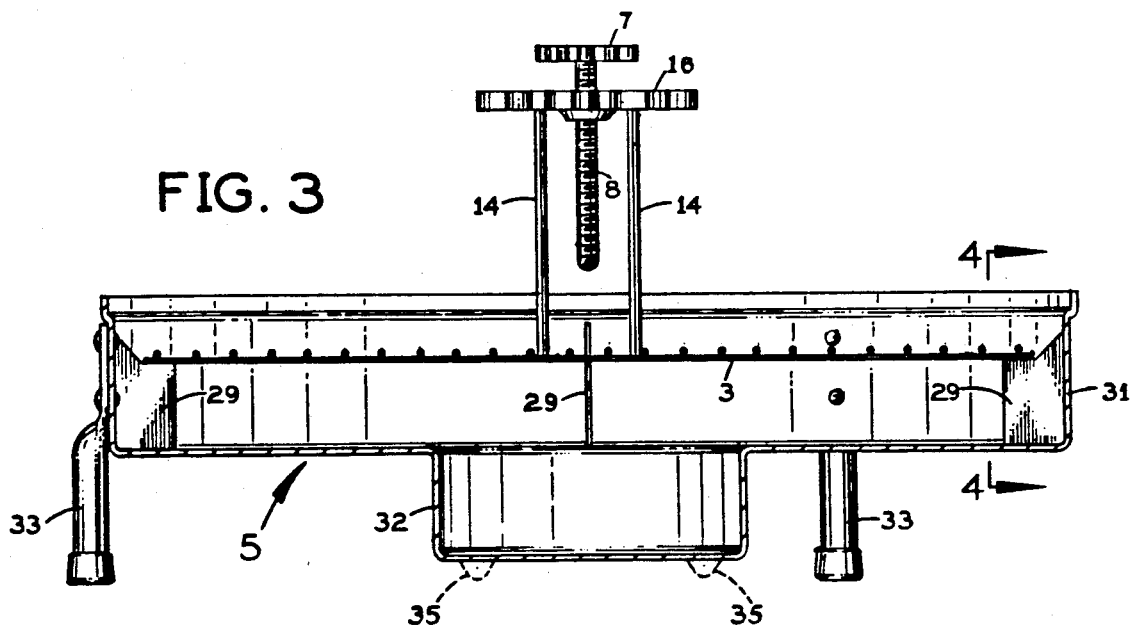
FIG. 3
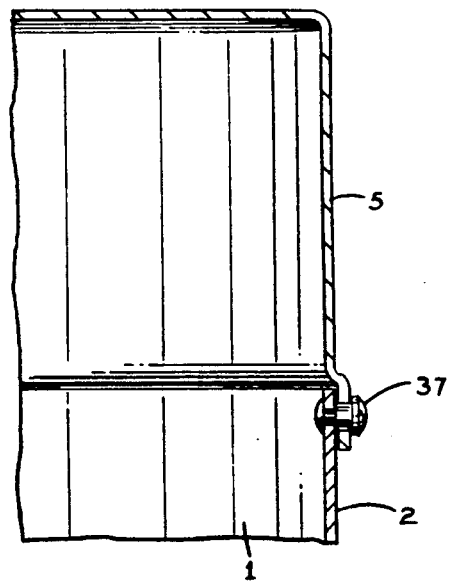
FIG. 4
FIG. 6
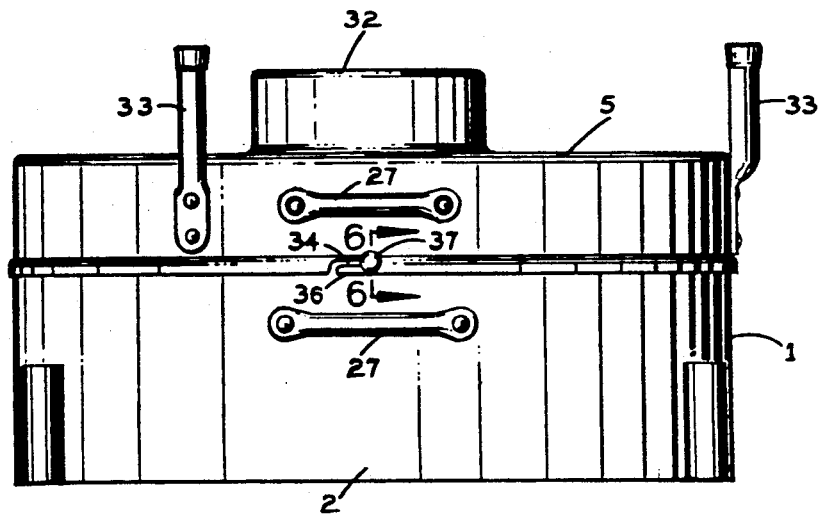
FIG. 5

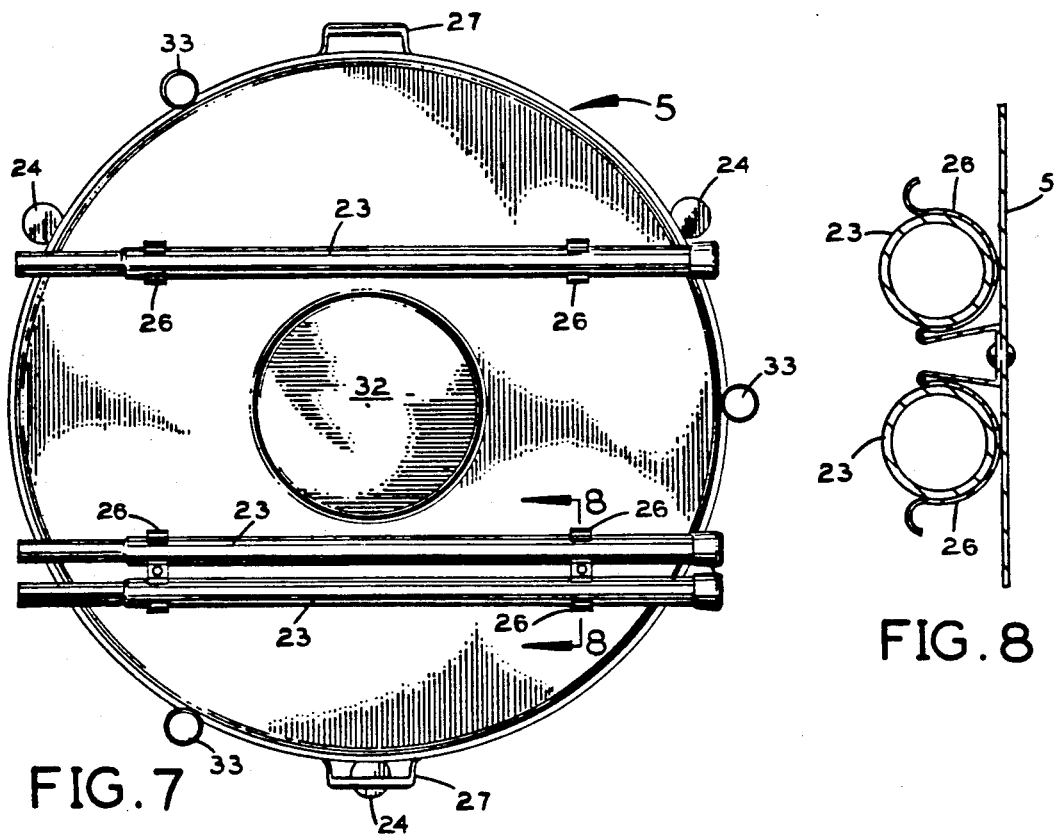
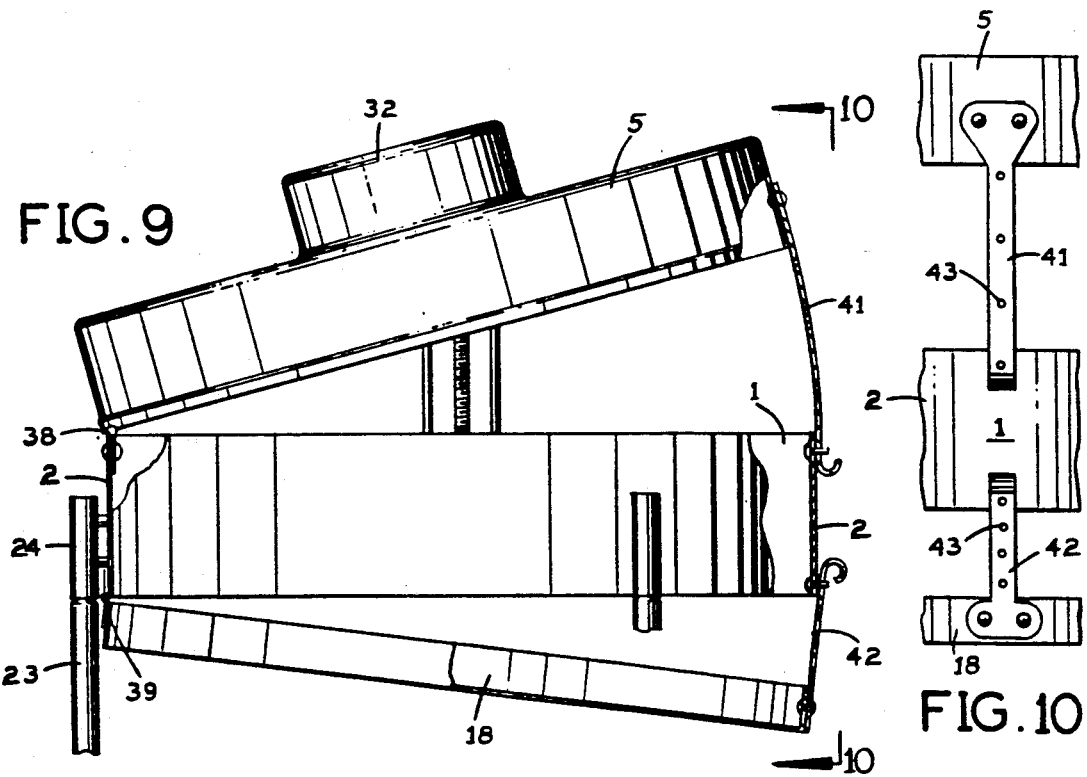

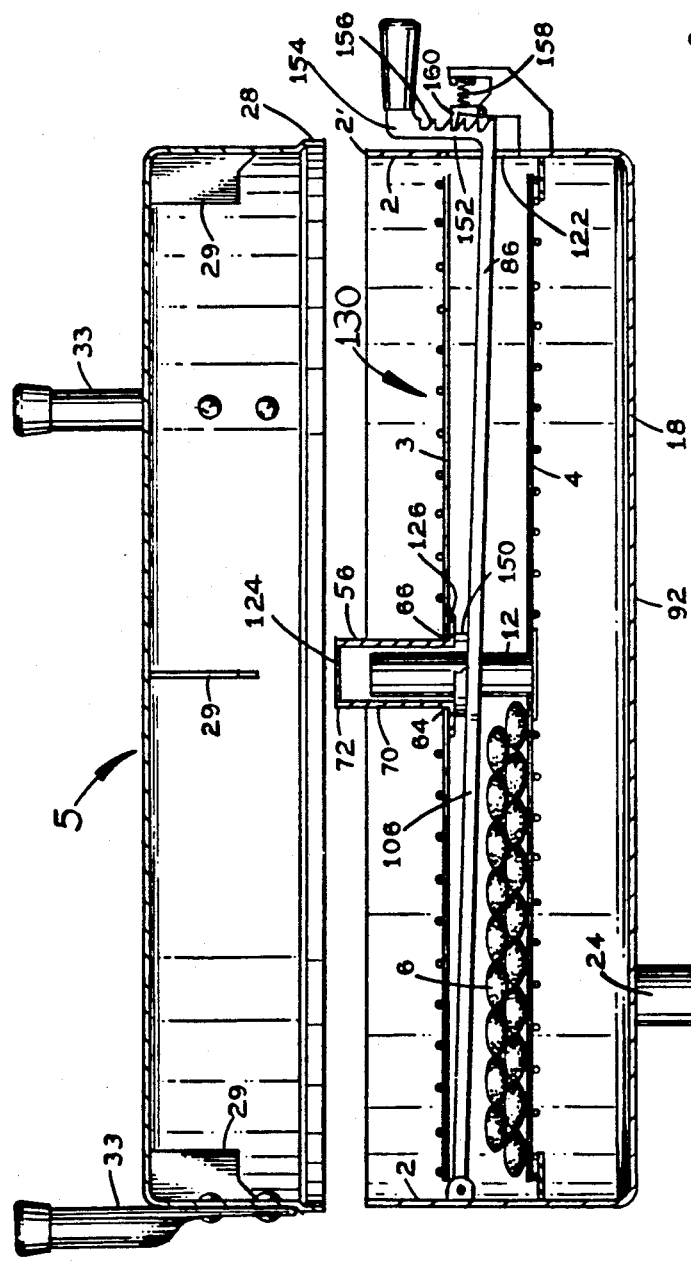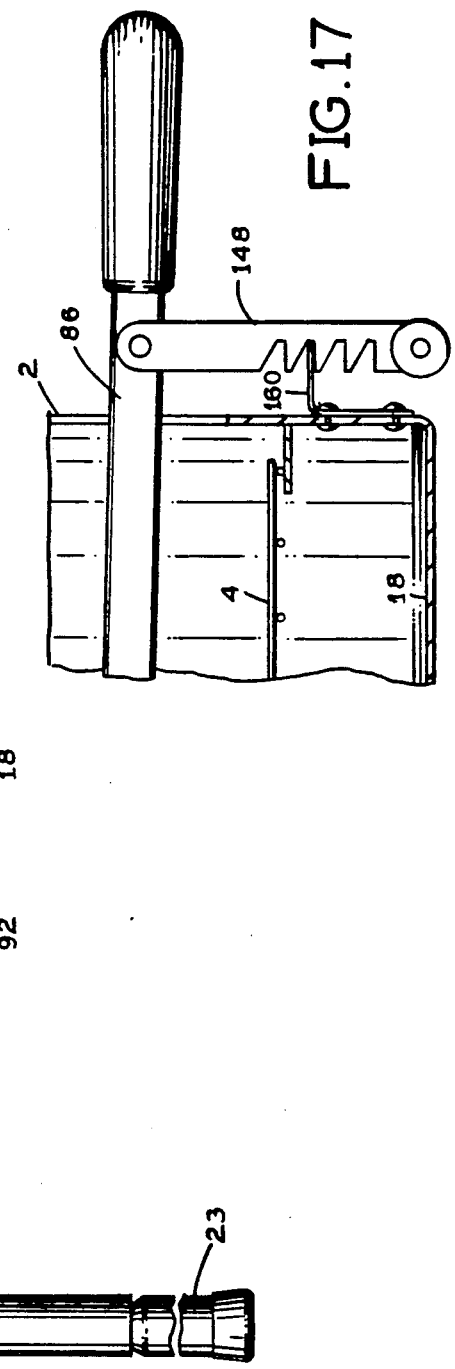

MULTI-CHAMBERED BARBECUE GRILL

CROSS-REFERENCE TO RELATED APPLICATION

This application is a continuation-in-part of application Ser. No. 74/067698, filed on June 11, 1990.

BACKGROUND OF THE INVENTION

1. Field of the Invention

The present invention relates generally to the field of barbecue grills, and more specifically to a barbecue grill having multiple chambers for improved cooking capability and ease of use.

2. Description of the Prior Art

A barbecue grill with multiple chambers for cooking meat and other foodstuffs is known from U.S. Pat. No. 4,932,390 to the applicant of the instant invention, which is a further improvement of aforesaid U.S. patent.

The aforesaid multi-chambered grill has the drawback that the grilled foodstuffs must be removed from the barbecue and placed in serving trays and the like before eating. In this process the food tends to become cold before it can be eaten, and additional eating utensils are required to be cleaned and/or disposed of.

Other barbecue grills of known construction have a similar disadvantage. These include Fuss, U.S. Pat. No. 3,598,102, issued on Aug. 10, 1971, and Thompson, U.S. Pat. No. 3,657,996, issued on April 25, 1972.

Fuss also fails to provide any means for raising and lowering the cooking grill. In addition, one cannot rotate the Fuss cooking grill without in some way touching its burning hot surface. Thompson provides mechanisms for rotating, raising and lowering the grill. These mechanisms, however, involve complex arrangements of gears and brackets which are expensive and prone to jamming.

SUMMARY OF THE INVENTION

The present invention accomplishes the above-stated objectives, as well as others, as may be determined by a fair reading and interpretation of the entire specification.

It is accordingly a primary object of the instant invention to provide a barbecue grill that overcomes the drawbacks of the known barbecue grills.

In accordance with the objects of the invention there is provided a multi-chambered barbecue grill having a main chamber, a cooking grill located in the main chamber, a fire source located in the main chamber below the cooking grill, an ash chamber integral with or attached to the main chamber below the fire source for catching ashes, and a reversible top chamber located above the main chamber, adapted for receiving the cooking grill in its reversed position.

In accordance with a further object, there is provided a barbecue grill wherein the fire source is a grate for supporting burning coals, or wherein said fire source is a gas burner, including an arrangement for supplying cooking gas to at least part of the gas burner.

In accordance with a further feature, there is provided a barbecue grill including a divider on top of the grate, which divides the grate into at least two sections, wherein one or several sections may contain burning coals.

In accordance with another feature there is provided a barbecue grill including a cooking grill support for rotatably supporting the cooking grill, and wherein the cooking grill support includes a height-adjusting arrangement for adjusting the height of the cooking grill above the fire source.

There may further be provided a barbecue grill wherein the cooking grill support includes a support bracket disposed above the cooking grill and is rigidly attached thereto and has a threaded hole therein with an axis perpendicular to the cooking grill, an elongate threaded member having a lower end threadedly receivable in the threaded hole, an upstanding post aligned with the threaded hole attached to the grate or fire source for rotatably supporting the lower end of the elongate threaded member.

There may alternatively be provided a barbecue grill wherein the fire source is a grate for supporting burning coals and the ash chamber has an underside, additionally including a tubular member attached to the grate and extending upward perpendicular to the grate for supporting the cooking grill in its lowest position and a push rod member slidably contained within the tubular member, which bears against underside of the cooking grill, for raising and lowering the cooking grill, said push rod member extending through a hole in said ash chamber, and supported at any of several elevations by support means attached beneath the ash chamber.

There may be provided a barbecue grill wherein the support means includes a lever member pivotally mounted on fulcrum means secured to the underside of the ash chamber, one end of the lever member extending under and supporting the push rod member and the other end forming a handle for pushing the lever member down or up to raise or lower, respectively, the push rod member, the lever member being adjustably secured in any of several positions by adjustment means.

There may be provided a barbecue grill wherein the support means includes a lever member, one end of which is pivotally mounted on fulcrum means secured to the underside of the ash chamber, extending under and supporting the push rod member, and the other end of which forms a handle for pivoting the lever member down or up to raise or lower, respectively, the push rod member, the lever member being adjustably secured in any of several elevations by adjustment means.

There may be provided a barbecue grill additionally including an inverted cup member having a lip and a closed end, wherein a hole is cut in the center of the cooking grill and the lip of the inverted cup member is attached to the cooking grill surrounding the hole, and the push rod extends through the hole and into the inverted cup member and presses against its closed end to support and to raise and lower the inverted cup member and the cooking grill.

Another alternative is provided wherein the support means includes a vertical support member which is cylindrical and has external threads and upper and lower ends, and passes through a hole in the bottom the main chamber having corresponding internal threads, such that the internal threads engage the external threads, the upper end of said vertical support member being attached to the cooking grill, for rotating and for raising and lowering the cooking grill by rotating the lower end of the vertical support member. The lower end of the vertical support member may be fitted with a knob for gripping and rotating.

The elevation mechanism may be contained within the main chamber between the cooking grill and the fire source. In this instance, the fire source is a grate for supporting burning coals, additionally including an upstanding post member attached to the grate and extending upward perpendicular to the grate for supporting the cooking grill in its lowest position, and an inverted cup member having a lip and a closed end, wherein a hole is cut in the center of the cooking grill and the lip of the inverted cup member is attached to the cooking grill so that the lip surrounds the hole, and the upstanding post member extends through the hole and into the inverted cup member to guide the cooking grill when the elevation of the cooking grill is changed, and an elevation mechanism for raising and lowering the cooking grill.

The elevation mechanism includes a lever member located between the cooking grill and the grate, pivotally attached to the main chamber wall and extending essentially diametrically across the interior of the main chamber and through a port in the main chamber wall to form a handle end of the lever member, for changing the elevation of the cooking grill, a tubular member which surrounds the upstanding post member and extends between the lever member and the cooking grill, for transmitting the movements of the lever member to the cooking grill, and a ratchet and pawl assembly for maintaining the lever member and the cooking grill at more than one elevation.

The elevation means may also include a fulcrum member mounted on the grate or the ash chamber and extending upward toward the cooking grill, having an essentially vertical edge with at least two teeth cut into the edge having and a horizontally projecting fulcrum pin, and a lever member with an axial slot for slidably receiving the fulcrum pin, and a horizontally projecting securing pin which can slide between the teeth when the lever member is slid axially in one direction, and out from the between the teeth when the lever member is slid axially in the opposite direction, one end of the lever member being located adjacent the upstanding post and supporting the cooking grill, and the other end extending through a port in the main chamber wall and serving as a handle for pivoting the lever member and thereby changing the elevation of the cooking grill.

The elevation means may also include a fulcrum member mounted on the grate or the ash chamber and extending upward toward the cooking grill having a horizontally projecting fulcrum pin, and a lever member with a pin hole for receiving the fulcrum pin, one end of the lever member being located adjacent the upstanding post and supporting the cooking grill, and the other end extending through a port in the main chamber wall and serving as a handle for pivoting the lever member and thereby changing the elevation of the cooking grill, said other end having a ratchet vertically and pivotally suspended therefrom for engaging a fixed pawl attached to the ash chamber.

In accordance with still another feature, there is provided a barbecue grill including cooking grill support means disposed in the reversible top chamber for supporting the cooking grill in its reversed position.

In accordance with a still further feature, there is provided a barbecue grill wherein the reversible top chamber includes an upward facing projection for supporting the top chamber in its reversed position.

In addition, there may be provided a barbecue grill which has a plurality of upward facing legs circumferentially attached to the reversible top chamber for supporting the top chamber in its reversed position, wherein the main chamber and the ash chamber have peripheral walls, wherein the peripheral wall of the ash chamber is inwardly spaced from the peripheral wall of the main chamber for forming air access to the fire source.

Further still, there may be provided a barbecue grill which includes a plurality of legs and an equal plurality of leg holders attached to the underside of the ash chamber or peripherally attached to the peripheral wall of the main chamber for receiving those legs.

BRIEF DESCRIPTION OF THE DRAWINGS

Various other objects, advantages, and features of the invention will become apparent to those skilled in the art from the following discussion taken in conjunction with the following drawings, in which:

3. FIG. 3 is an elevational view of the invention showing the reversible top chamber in reversed position;

4. FIG. 4 is a fragmentary detail view showing a bracket for supporting the cooking grill;

5. FIG. 5 is an elevational view of the invention showing external details of the invention assembled for storage;

6. FIG. 6 is an elevational fragmentary enlarged detail of the invention showing a latching detail for the top chamber;

7. FIG. 7 is a top plan view of the invention showing the legs inserted in resilient leg holders for storage;

8. FIG. 8 is a fragmentary detail view of the invention showing the chambers in opened position;

9. FIG. 9 is an elevational view of the invention showing the chambers in opened position;

10. FIG. 10 is a fragmentary enlarged detail view showing holding details, seen along the line 10—10 of FIG. 9;

17. FIG. 17 is a close-up view of a preferred ratchet construction for securing the lever member and grill at any of several elevations, wherein the ratchet is pivotally suspended from the handle end of the lever member and engages a fixed pawl attached to the ash chamber.

18. FIG. 18 is a side cross-sectional view as in FIG. 16 wherein the lever member is pivotally attached to the main chamber wall and extends diametrically through the main chamber.

DETAILED DESCRIPTION OF THE PREFERRED EMBODIMENT

Figures 1, 2:
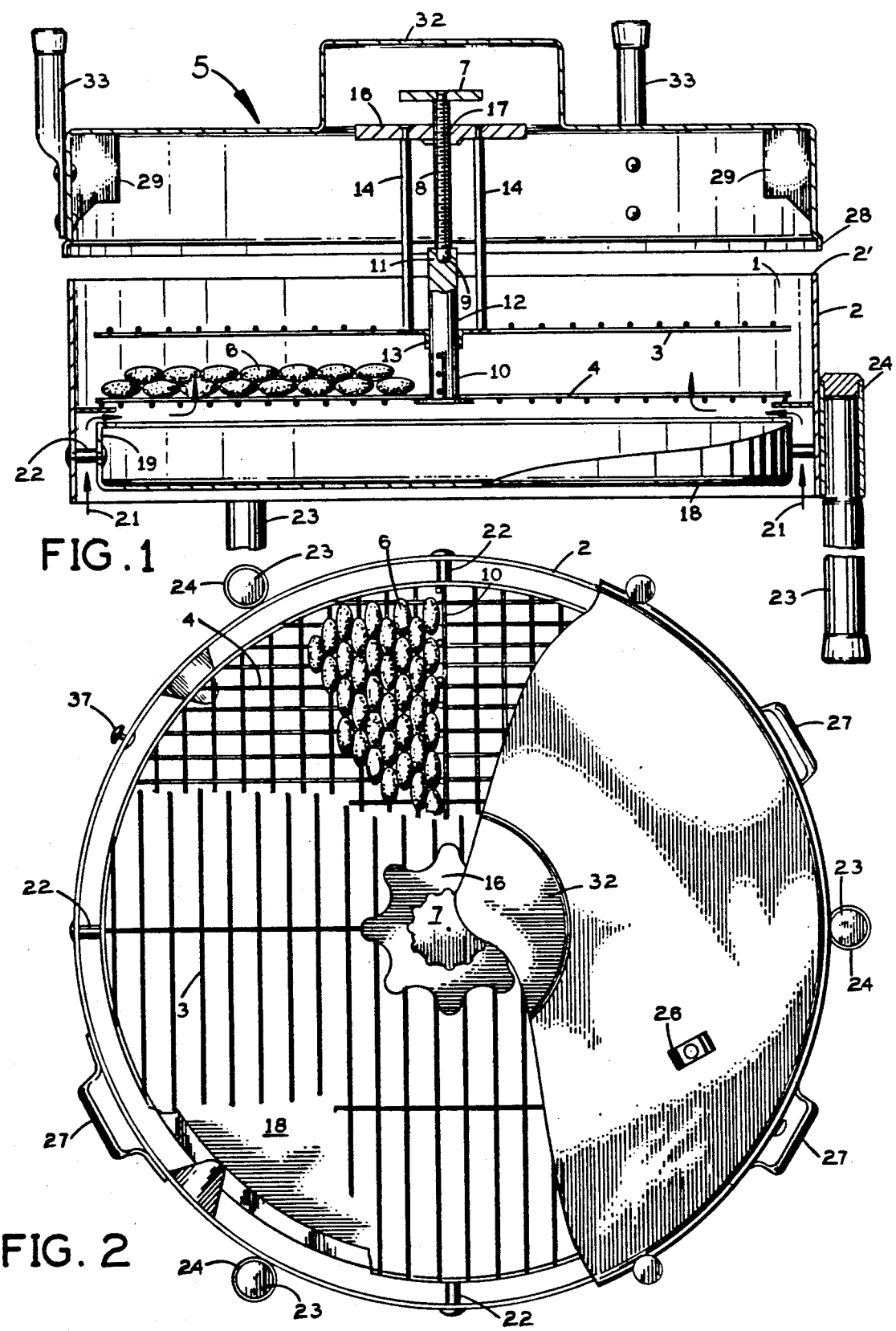
FIG. 1 is an elevational cross-sectional view of the first embodiment of the invention, showing the interior construction. The optional features of peripherally attached legs and a non-integral ash chamber are as illustrated in FIGS. 1 through 10.
FIG. 2 is a plan view of the invention with part of the wall broken away to show the interior construction.
Figure 11:
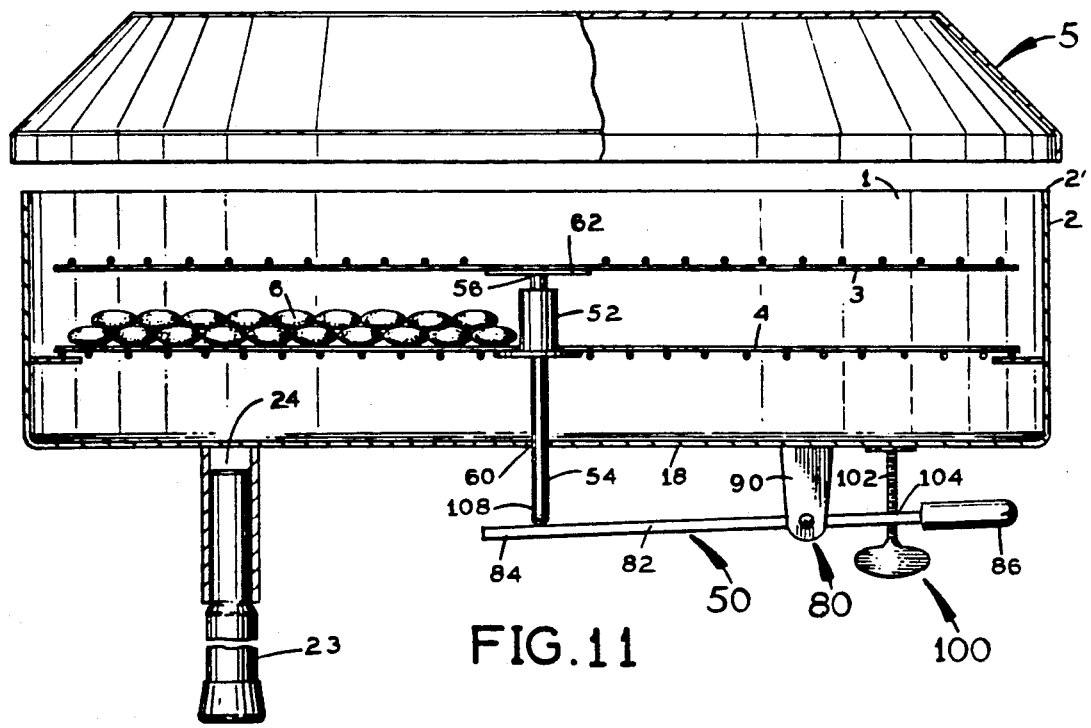
FIG. 11 is a side cross-sectional view of the invention showing the interior construction of the elevation assembly wherein an end of the lever member supports the push rod. This and subsequent FIGURES illustrate the preferred leg and leg holder attachment positions at the underside of the ash chamber, and the preferred ash chamber design which is integral with the main chamber.
Figure 12:
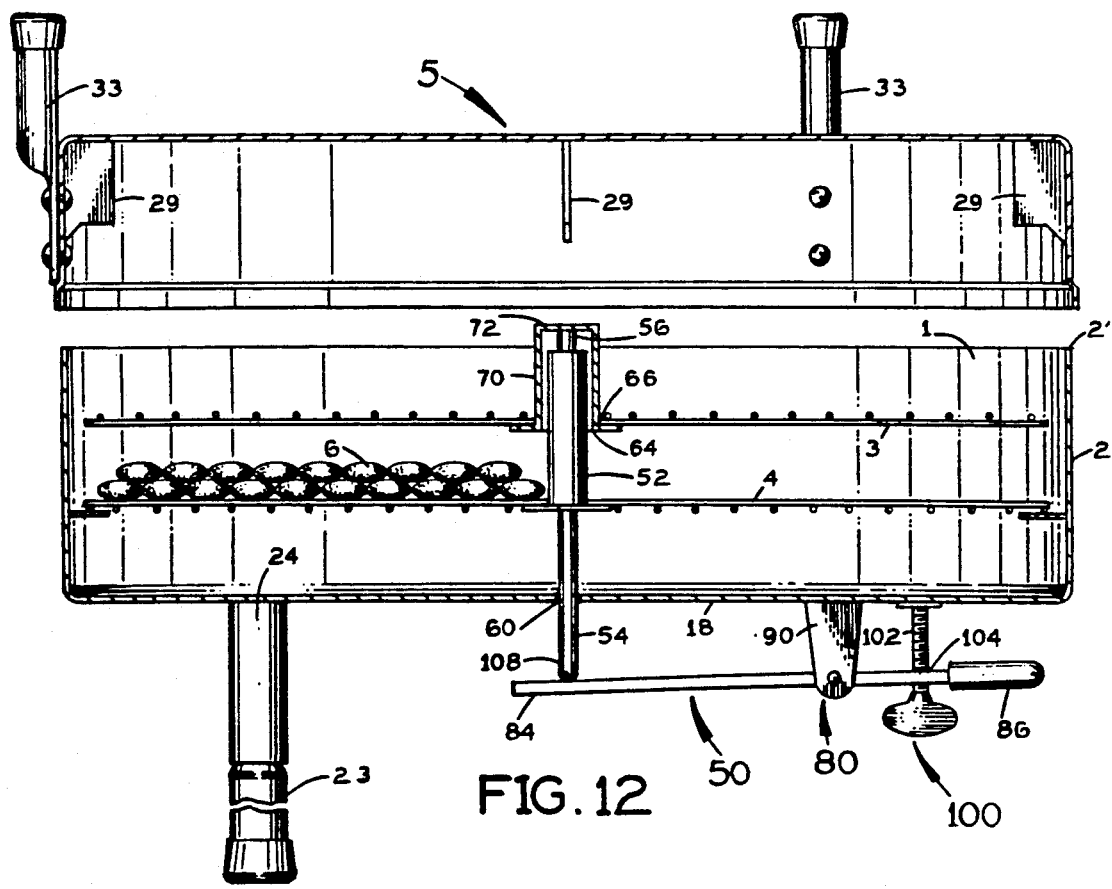
FIG. 12 is a side cross-sectional view of the invention showing the interior construction of the elevation assembly wherein an end of the lever member supports the push rod, and the cooking grill includes the inverted cup member feature.
Figure 13:
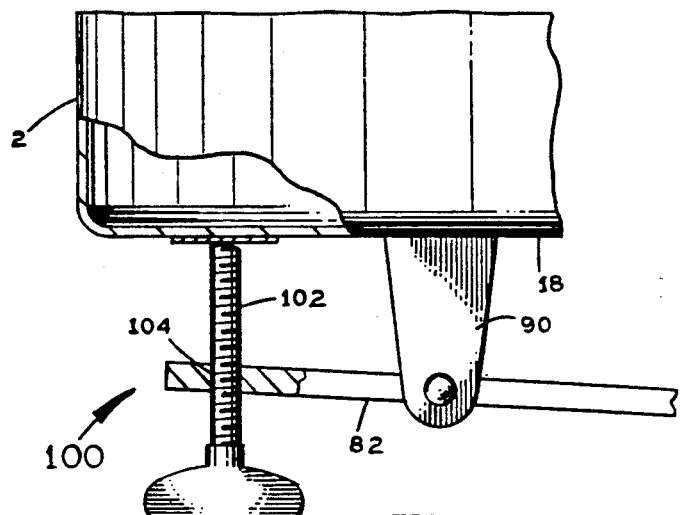
FIG. 13 is a fragmentary detail view of the lever member adjustment assembly.
Figure 14:
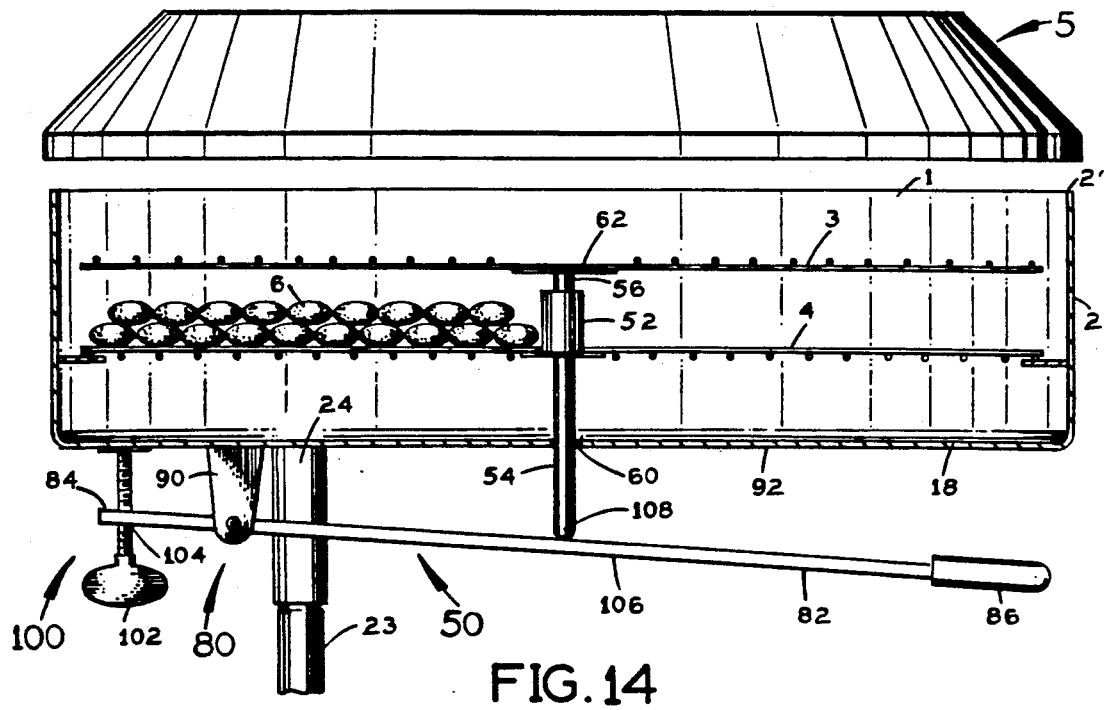
FIG. 14 is a side cross-sectional view of the invention showing the interior construction of the elevation assembly wherein the middle of the lever member supports the push rod; and 15.
Figure 15:
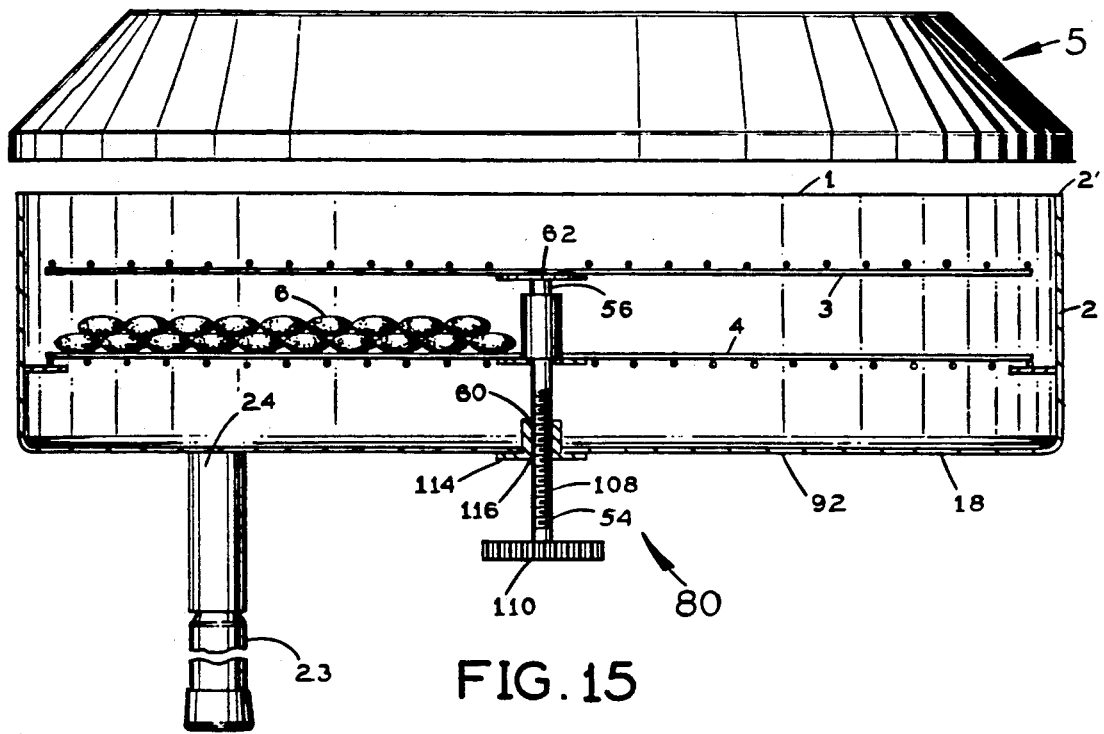
FIG. 15 is a side cross-sectional view of the invention showing the interior construction of the elevation assembly wherein the push rod is threaded and engages threads in a hole in the ash chamber.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

FIRST PREFERRED EMBODIMENT

Referring to FIGS. 1, 2, 3, 5, 7 and 8 a main chamber 1, advantageously of circular construction, with a peripheral wall 2 which contains a cooking grill 3 on which foodstuffs to be grilled or cooked can be placed, is shown. Below the cooking grill 3 there is a fire source, e.g. in the form of a slotted grate 4 which can hold a fire source, such as coal briquets 6, wood chips, charcoal or other combustible materials. A divider 10 in the form of a low vertical wall is positioned atop the grate 4 dividing the surface of the grate into two or more sections that each, several or all can be used to support burning material. The drawing shows the grate divided into two sections of which, for example, the left hand section may be covered with burning coals, as shown. The user of the barbecue grill can selectively heat the food-stuffs placed on the cooking grill 3 by turning it by means of a handle having a vertical elongate member 8 resting with its lower end 9 on the upper end 11 of an upstanding post 12 rigidly attached to the grate 4. By intermittently turning the handle, the user can accomplish intermittent cooking in which the food goes back and forth over the coals until it is properly cooked.

The post 12 leads loosely through an opening 13 in the grate 3 which is suspended by at least two downward facing rods 14, each attached at its upper end to a transverse support bracket 16, with a threaded hole 17 through which the elongate member 8 is threaded. The suspended grate 3 can rotate about the post 12, and its height above the grate 3 ca be adjusted by turning the knob 7 with the threaded member 8 in the threaded hole 17.

The fire source 4 can alternatively be a gas burner (not shown) with several gas jets as is well known, wherein various jets or groups of jets can be supplied with cooking gas through separate gas valves so that the heating surface can be sectionalized in a manner similar to the divided grate sections described above.

An ash chamber 18 to catch ashes and embers from the burning coals 6 is preferably a horizontal bottom wall integrally joined with main chamber walls 2. Alternatively, ash chamber 18 is a disk-shaped pan with upstanding peripheral walls 19 placed below the grate 4 and having its walls 19 spaced inward from the main chamber walls 2 to form a space indicated by arrows 21 for admitting air to the fire source 4. This alternative variation of ash chamber 18 is attached by rivets 22, screws or the like to the peripheral walls 2 of the main chamber 1. FIGS. 1 through 10 illustrate the invention with the alternative ash chamber 18 design, while FIGS. 11 through 17 illustrate the preferred ash chamber 18 design.

A plurality of legs 23 are slidably inserted in leg holders 24. After use, the legs 23 can be drawn out of the holders 24, and stored in resilient snap-in leg holders 26, best seen in FIGS. 7 and 8. Holders 24 may be attached to the periphery of chamber walls 2, as illustrated in FIGS. 1 through 10, or attached to the underside of ash chamber 18, as illustrated in FIGS. 11 through 17.

Carrying handles 27 may advantageously be attached to the main chamber walls 2.

An upper top chamber 5 with lower rolled edges 28 that fit over the peripheral walls 2 of the main chamber 1 serves two purposes, namely that of a cover for the main chamber 1, as shown in FIGS. 1 and 2, and that of supporting the cooking grill 3 in its inverted (upside-down) position, as shown in FIG. 3, for serving the cooked foodstuffs after completion of cooking. To that end a plurality of small inward facing brackets 29 are disposed peripherally along the peripheral wall 31 of the top chamber 5, attached to the peripheral walls 31. The top chamber 5 has an upward facing projection 32, that in its normal position, as seen in FIG. 1, makes room for the handle 7 and support bracket 16, and in its inverted position, seen in FIG. 3, serves to catch drippings and gravy from the grilled foodstuffs, after the cooking grill has been removed from the main chamber and placed on the brackets 29 of the upturned top chamber 5, as seen in FIG. 3.

The top chamber 5 may advantageously have short legs 33 as seen in FIGS. 1 and 3 that serve to steady the top chamber in its reversed position, for example on top of a table (not shown). Alternatively the projection 32 may have small dimples 35, as seen in FIG. 3 for steadying the top chamber in the reversed position.

FIG. 4 shows the brackets 29 as seen along the line 4—4 of FIG. 3.

FIGS. 5 and 6 show the top chamber 5 secured to the main chamber 1 in assembled position, e.g. for storage, by means of a slot 34 and lip 36 attachment and a rivet 37.

FIG. 9 shows the top chamber 5 and ash chamber 18 pivotally attached by means of respective hinges 38, 39 to the walls 2 of the main chamber 1 as may be required to control airflow to the heat source in the main chamber. Respective holding brackets 41, 42, with adjusting holes 43 are advantageously provided to respectively hold the top or bottom chamber in a selected position.

SECOND PREFERRED EMBODIMENT

The second preferred embodiment is like the first, except that threaded member 8, upstanding post 12, rods 14 and bracket 16 are replaced with an elevation assembly 50. Assembly 50 raises and lowers the cooking grill 3 and is operated from underneath the ash chamber 18. Assembly 50 may take any of several forms, which include the following.

A tubular member 52 is attached to the center of grate 4 and extends perpendicularly upward. See FIG. 11. A push rod 54 extends axially through member 52, through grate 4, and through a hole 60 in the center of ash chamber 18. The top end 56 of push rod 54 bears against cooking grill 3, so that moving push rod 54 upward within member 52 raises cooking grill 3. Conversely, moving push rod 54 downward lowers cooking grill 3. The lowest position of cooking grill 3 is reached when cooking grill 3 rests on tubular member 52. Cooking grill 3 may include a solid center plate 62 for push rod 54 to bear against. Rather than simply bearing against cooking grill 3, push rod 54 may alternatively be attached thereto.

Alternatively, the center of cooking grill 3 may be cut away to form a port 64 surrounded by the lip 66 of an inverted cup member 70, which is attached to cooking grill 3. See FIG. 12. In this instance, push rod 54 is of sufficient length to extend through port 64 into cup member 70, so that top end 56 bears against closed end 72. When cooking grill 3 is in its lowest position, closed end 72 rests on tubular member 52. Rather than simply bearing against closed end 72, push rod 54 may alternatively be attached thereto.

Push rod 54 is moved upward and downward within tubular member 52 by an adjustable support apparatus 80. Apparatus 80 includes a lever member 82 having a support end 84 and a handle end 86. Lever member 82 is mounted on a fulcrum 90 attached to the underside 92 of ash chamber 18. Push rod 54 rests on the support end 84 of lever member 82. An adjustment device 100, such as a screw 102 extending through a threaded passageway 104 in lever member 82 and against underside 92, holds handle end 86 in one of many possible positions, in turn holding push rod 54 at one of many elevations. See FIG. 13. Push rod 54 is not attached to lever member 82, so that push rod 54 remains free to rotate, which in turn assures that cooking grill 3 is free to rotate.

Fulcrum 90 may alternatively be attached to the edge of the underside 92 of ash chamber 18. The end of lever member 82 which was support end 84 in the above described arrangement is pivotally joined to fulcrum 90. Lever member 82 extends diametrically across the underside 92 from fulcrum 90 to handle end 86. In this instance, the middle 106 of lever member 82 supports push rod 54. See FIG. 14. Again, push rod 54 is not attached to lever member 82.

The lower portion 108 of push rod 54 may alternatively be threaded and engage corresponding threads in hole 60. This permits the raising and lowering of push rod 54, and thus of cooking grill 3, simply by rotating push rod 54 in one direction or the other. See FIG. 15. A knob 110 is preferably affixed to the lower end 112 of push rod 54 for the user to grip while turning push rod 54.

Hole 60 and its internal threads may be extended for added strength by attaching a plate 114 with a threaded bore 116 over hole 60. Bore 116 is of the same diameter as hole 60 and they are aligned one above the other with a common center axis.

THIRD PREFERRED EMBODIMENT

The third preferred embodiment is similar to the second. The elevation assembly 50 is contained within the main chamber 1 between the cooking grill 3 and the grate 4. See FIGS. 16 and 17. Assembly 50 is operated by moving the handle end 86 of lever member 82, which extends through a vertical slot 122 in main chamber wall 2.

The cooking grill 3 is fitted with the cup member 70. Upstanding post 12, as described for the first embodiment, extends from grate 4 into cup member 70. When the cooking grill 3 is in its lowest position, the closed end 72 of cup member 70 rests on the top end 124 of upstanding post 12. Lever member 82 bears against the cooking grill 3, adjacent to cup member 70, to raise, lower and support cooking grill 3. Cup member 70 may be provided with a flange portion 126 extending from lip 66 underneath cooking grill 3, to provide a solid surface for lever member 82 to bear against.

Figure 16:
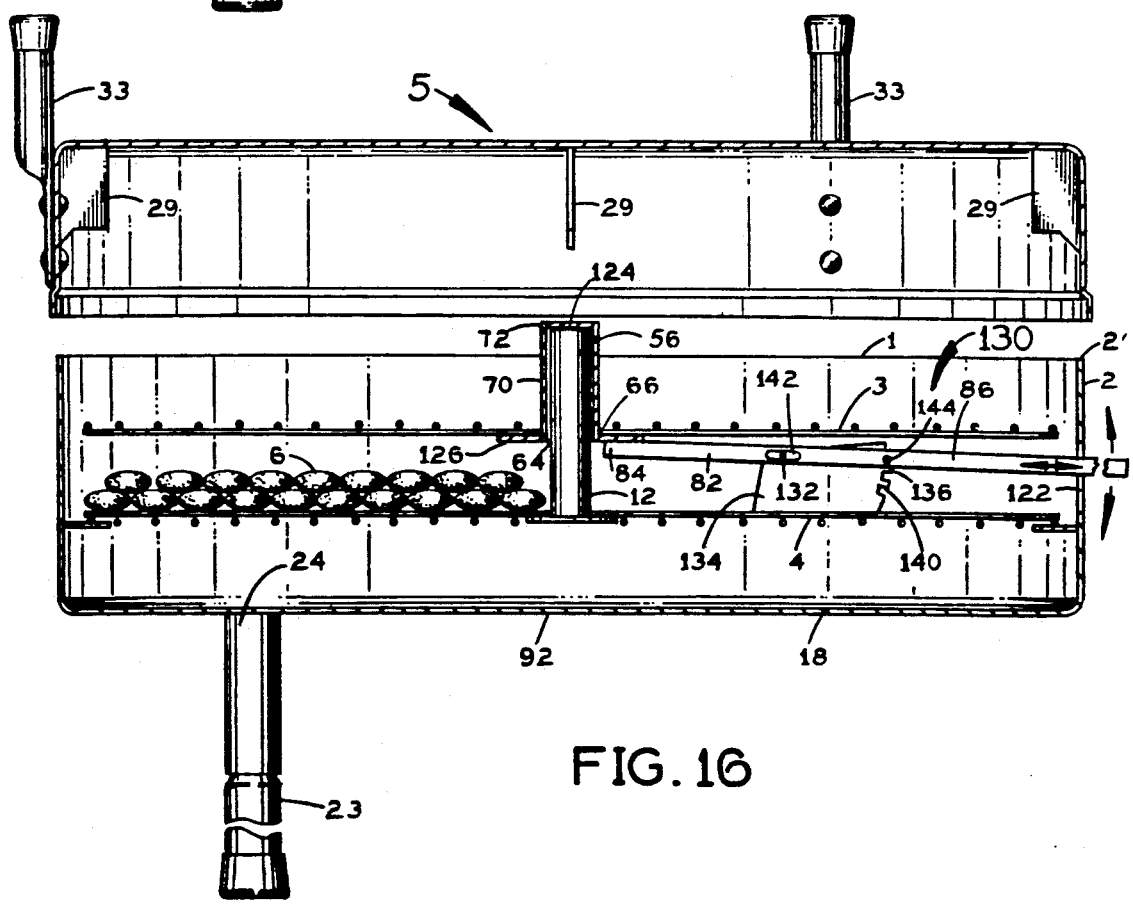
FIG. 16 is a side cross-sectional view of the invention showing the interior construction of the elevation assembly wherein the lever member extends radially from the center of the main chamber between the cooking grill and the grate through a port in the main chamber wall and pivots on a fulcrum mounted on the grate.

Lever member 82 can be mounted in at least two ways, each having its own particular adjustment and support mechanism 130. The first way, illustrated in FIG. 16, is for lever member 82 to extend only to the middle of cooking grill 3, terminating to form support end 84. Support end 84 may take the form of a fork or ring surrounding upstanding post 12, or a slat extending adjacent to or through upstanding post 12. Lever arm 82 pivots on a fulcrum pin 132 projecting from a fulcrum member 134. Fulcrum member 134 is a plate mounted vertically along a radial line between upstanding post 12 and wall 2, and attached to ash chamber 18. The vertical edge 136 of fulcrum member 134 closest to wall 2 is cut into a radial arc with its center at pin 132. Edge 136 is notched to form gear teeth 140. Fulcrum pin 132 extends through an axial slot 142 in lever member 82, which permits lever member 82 to slide longitudinally beside fulcrum member 134 over fulcrum pin 132. A positioning pin 144 projects from lever member 82. When lever member 82 is slid toward upstanding post 12, positioning pin 144 slides between two of the gear teeth 140. Teeth 140 may alternatively extend from the exterior of wall 2, adjacent vertical slot 122, with positioning pin 144 once again located to slide between teeth 140.

To adjust the height of cooking grill 3, lever member 82 is slid longitudinally away from upstanding post 12. This action causes positioning pin 144 to slide out from between gear teeth 140, freeing lever member 82 to pivot about fulcrum pin 132. Lever member 82 is pivoted to raise or lower cooking grill 3 to the desired elevation. Then lever member 82 is slid toward upstanding post 12 to place positioning pin 144 between two of the adjacent gear teeth 140. This holds lever member 82 and cooking grill 3 in the desired position until further repositioning is sought. The coal briquets 6 is preferably confined to the side of grate 4 opposite mechanism 130.

Alternatively, fulcrum member 134 may be mounted on grate 4 or ash chamber 18 and extend upward toward cooking grill 3, having a horizontally projecting fulcrum pin 132 fitting through a pin hole 142 in lever member 82. A ratchet 148 is vertically and pivotally suspended from handle end 86 for engaging a fixed pawl 160 attached to ash chamber 18 or main chamber 1. See FIG. 17.

The other illustrated variation of this embodiment is like the first, except that lever member 82 extends diametrically across the interior of main chamber 1 and is pivotally attached to wall 2 opposite handle end 86. See FIG. 18. Lever member 82 is contained within separating wall 10, which for this variation is a double wall. A tube 150 slidably surrounds upstanding post 12 and extends from the middle 106 of lever member 82 to flange portion 126. Cooking grill 3 is supported by flange portion 126, which rests on tube 150. which in turn rests on the middle 106 of lever member 82. Handle end 86 is bent upward at a right angle to form a connector portion 152, and then turns at another right angle to again extend in its original direction away from upstanding post 12. The remote edge 154 of connector portion 152 is cut to form ratchet teeth 156, which slope only in the downward direction, and are engaged by a pawl 160. Pawl 160 is resiliently retained against remote edge 154 by a spring 158.

To adjust the height of cooking grill 3, handle end 86 is lifted to raise the cooking grill 3. The slope of ratchet teeth 156 permits the pawl 160 to slide over them when the handle end 86 is raised. When the desired elevation of cooking grill 3 is reached, handle end 86 is simply released. Spring 158 causes pawl 160 to automatically engage teeth 156 and prevent downward movement. To lower cooking grill 3, the pawl 160 is pulled out from between ratchet teeth 156, and handle end 86 is lowered until cooking grill 3 reaches the desired elevation. Then the pawl 160 is released to again engage ratchet teeth 156 and retain cooking grill 3 at this elevation. The pivoting, suspended ratchet and pawl assembly set forth earlier may alternatively secure handle end 86.

The low profiles of the elevation assemblies of the second and third embodiments illustrated in FIGS. 11 and 13-15 permit the use of the beveled lid shown in those FIGURES. The beveled portion fits against the rim of the main chamber 1 when top chamber 5 is inverted, eliminating the need for top chamber 5 short legs 33.

The grill of the invention can be used in two modes:
Half-a-grill mode: In this mode only half of the grate is filled with charcoal, this becoming the "fireside" with the other half becoming the "indirect heat side". The "indirect heat side" achieves four functions:
a) Intermittent exposure cooking: The free-spinning grid with the food on it can be rotated back and forth over the "fire side" (for direct exposure to the fire) and the "indirect heat side" (for continuity of cooking at lower heat). The food can be brought back to the "fire side" for a final roasting of the surface of the food. In most grills this is not possible as the surface of the food is being roasted and burned while the center is still raw.
b) Defrosting: The food is left over the "indirect heat side" to accomplish defrosting.
c) Keep warm: The "indirect heat side" allows the food to be kept warm until it is ready to be served.
d) Verification of degree of cooking: A piece of food can be cut to determine to what extent it has been cooked inside, and this can be done without exposing the hands to the fire. When cooking on the "indirect side", the hands are farther away from the fire. When cooking on the "fire side", in case of a flame-up, the food can be rotated away from the fire to the "indirect heat side".

Full-grill mode: Both halves of the grate can be loaded with charcoal if desired, for example to cook a large amount of food, while still retaining the advantages of the rotating grid and vertical adjustment of the grid.

This novel, economical way of barbecuing using Intermittent Exposure Cooking greatly reduces or eliminates the roast-burn biproduction of toxic, dangerous substances and allows direct and indirect cooking and defrost-keep warm capabilities.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A multi-chamber barbecue grill comprising a main chamber, a cooking grill disposed in said main chamber, a fire source disposed in said main chamber below said cooking grill, an ash chamber attached to said main chamber below said fire source for catching ashes, a reversible top chamber disposed above said main chamber, adapted for receiving said cooking grill in its reversed position, and first cooking grill support means disposed in said reversible top chamber for supporting said cooking grill in its reversed position.

2. A barbecue grill according to claim 1, wherein said fire source is a grate for supporting burning coals.

3. A barbecue grill according to claim 1, wherein said fire source has two sections, each for supporting burning coals.

4. A barbecue grill according to claim 2, including a divider atop said grate for dividing said grate into at least two sections, each for containing burning coals.

5. A barbecue grill according to claim 1, including second cooking grill support means for rotatably supporting said cooking grill.

6. A barbecue grill according to claim 5, wherein said cooking grill support means include height-adjusting means for adjusting the height of said cooking grill above said fire source.

7. A barbecue grill according to claim 5, wherein said cooking grill support means include a support bracket disposed above said cooking grill rigidly attached thereto and having a threaded hole therein with an axis perpendicular to said cooking grill, an elongate threaded member having a lower end threadedly receivable in said threaded hole, an upstanding post, aligned with said threaded hole, attached to said fire source for rotatably supporting said lower end of said elongate threaded member.

8. A barbecue grill according to claim 5, wherein the fire source is a grate for supporting burning coals and the ash chamber has an underside, additionally comprising a tubular member attached to the grate and extending upward perpendicular to the grate for supporting the cooking grill in its lowest position and a push rod member slidably contained within the tubular member, which bears against the underside of the cooking grill, for raising and lowering the cooking grill, said push rod member extending through a hole in said ash chamber, and supported at any of several elevations by support means attached beneath the ash chamber.

9. A barbecue grill as in claim 8, wherein the support means comprises a lever member pivotally mounted on fulcrum means secured to the underside of the ash chamber, one end of the lever member extending under and supporting the push rod member and the other end forming a handle for pushing the lever member down or up to raise or lower, respectively, the push rod member, the lever member being adjustably secured in any of several positions by adjustment means.

10. A barbecue grill as in claim 8, wherein the support means comprises a lever member, one end of which is pivotally mounted on fulcrum means secured to the underside of the ash chamber, extending under and supporting the push rod member, and the other end of which forms a handle for pivoting the lever member down or up to raise or lower, respectively, the push rod member, the lever member being adjustably secured in any of several elevations by adjustment means.

11. A barbecue grill as in claim 10, wherein the push rod member is attached to the cooking grill.

12. A barbecue grill as in claim 8, additionally comprising an inverted cup member having a lip and a closed end, wherein a hole is cut in the center of the cooking grill and the lip of the inverted cup member is attached to the cooking grill so that the lip surrounds the hole, and the push rod extends through the hole and into the inverted cup member and presses against its closed end to support and to raise and lower the inverted cup member and the cooking grill.

13. A barbecue grill as in claim 12, wherein the push rod member is attached to the cup member.

14. A barbecue grill as in claim 8, wherein the support means comprises a vertical support member which is cylindrical and has external threads and upper and lower ends, and passes through a hole in the bottom the main chamber having corresponding internal threads, such that the internal threads engage the external threads, and the upper end of said vertical support member is attached to the cooking grill, for rotating and for raising and lowering the cooking grill by rotating the lower end of the vertical support member.

15. A barbecue grill as in claim 14, wherein the lower end of the vertical support member is fitted with a knob for gripping when rotating.

16. A barbecue grill according to claim 5, wherein the fire source is a grate for supporting burning coals, additionally comprising an upstanding post member attached to the grate and extending upward perpendicular to the grate for supporting the cooking grill in its lowest position, and an inverted cup member having a lip and a closed end, wherein a hole is cut in the center of the cooking grill and the lip of the inverted cup member is attached to the cooking grill so that the lip surrounds the hole, and the upstanding post member extends through the hole and into the inverted cup member to guide the cooking grill when the elevation of the cooking grill is changed, and elevation means for raising and lowering the cooking grill.

17. A barbecue grill as in claim 16, wherein the elevation means comprises a lever member located between the cooking grill and the grate, pivotally attached to the main chamber wall and extending essentially diametrically across the interior of the main chamber and through a port in the main chamber wall to form a handle end of the lever member, for changing the elevation of the cooking grill, a tubular member which surrounds the upstanding post member and extends between the lever member and the cooking grill, for transmitting the movements of the lever member to the cooking grill, and ratchet and pawl means for maintaining the lever member and the cooking grill at more than one elevation.

18. A barbecue grill as in claim 16, wherein the elevation means comprises a fulcrum member mounted on the grate and extending upward toward the cooking grill, having an essentially vertical edge with at least two teeth cut into the edge having and a horizontally projecting fulcrum pin, and a lever member with an axial slot for slidably receiving the fulcrum pin, and a horizontally projecting securing pin which can slide between the teeth when the lever member is slid axially in one direction and out from the between the teeth when the lever member is slid axially in the opposite direction, one end of the lever member being located adjacent the upstanding post and supporting the cooking grill, and the other end extending through a port in the main chamber wall and serving as a handle for pivoting the lever member and thereby changing the elevation of the cooking grill.

19. A barbecue grill as in claim 16, wherein the elevation means comprises a fulcrum member mounted on the ash chamber and extending upward toward the cooking grill, having an essentially vertical edge with at least two teeth cut into the edge having and a horizontally projecting fulcrum pin, and a lever member with an axial slot for slidably receiving the fulcrum pin, and a horizontally projecting securing pin which can slide between the teeth when the lever member is slid axially in one direction and out from the between the teeth when the lever member is slid axially in the opposite direction, one end of the lever member being located adjacent the upstanding post and supporting the cooking grill, and the other end extending through a port in the main chamber wall and serving as a handle for pivoting the lever member and thereby changing the elevation of the cooking grill.

20. A barbecue grill according to claim 16, wherein the elevation means comprises a fulcrum member mounted on the ash chamber and extending upward toward the cooking grill having a horizontally projecting fulcrum pin, and a lever member with a pin hole for receiving the fulcrum pin, one end of the lever member being located adjacent the upstanding post and supporting the cooking grill, and the other end extending through a port in the main chamber wall and serving as a handle for pivoting the lever member and thereby changing the elevation of the cooking grill, said other end having a ratchet pivotally suspended therefrom for engaging a fixed pawl attached to the ash chamber.

21. A barbecue grill according to claim 1, including cooking grill support means, disposed in said reversible top chamber for supporting said cooking grill in its reversed position.

22. A barbecue grill according to claim 21, including a plurality of upward facing legs circumferentially attached to said reversible top chamber for supporting said top chamber in the reversed position.

23. A barbecue grill according to claim 21, including a plurality of resilient leg holders attached to said reversible top chamber for detachably receiving said legs.

24. A barbecue grill according to claim 1, wherein said reversible top chamber includes an upward facing projection for supporting said top chamber in its reversed position.

25. A barbecue grill according to claim 1, wherein the main chamber has a top rim and the reversible top chamber has an essentially circular top edge which is beveled to fit against the top rim of the main chamber when the top chamber is inverted.

26. A barbecue grill according to claim 25, including at least one hinge attached to said peripheral wall of said main chamber for hingedly attaching at least one of said top chamber and said ash chamber to said main chamber.

27. A barbecue grill according to claim 1, wherein the ash chamber is attached to the main chamber.

28. A barbecue grill according to claim 27, wherein said main chamber and said ash chamber have peripheral walls, wherein said peripheral wall of the chamber is inward spaced from the peripheral wall of said main chamber for forming an air access to said fire source.

29. A barbecue grill according to claim 28, including a plurality of legs, and an equal plurality of leg holders peripherally attached to said peripheral wall of said main chamber for receiving said legs.

30. A barbecue grill according to claim 28, wherein the ash chamber has an underside, including a plurality of legs, and an equal plurality of leg holders attached to the underside of the ash chamber for receiving said legs.

* * * * *